United States Patent Office 3,770,728
Patented Nov. 6, 1973

3,770,728
SUBSTITUTED 4H-BENZO[4,5]CYCLOHEPTA[1,2-b]
THIOPHEN-10(9H)-ONES
Jean-Pierre Bourquin, Magden, Aargau, Gustav Schwarb, Allschwil, and Erwin Waldvogel, Aesch, Switzerland, assignors to Sandoz Ltd., Basel, Switzerland
No Drawing. Filed Sept. 7, 1971, Ser. No. 178,449
Claims priority, application Switzerland, Sept. 24, 1970, 14,120/70; Feb. 4, 1971, 1,632/71
Int. Cl. C07d 63/18
U.S. Cl. 260—240 TC    12 Claims

ABSTRACT OF THE DISCLOSURE

The invention concerns benzocycloheptathiophene derivatives of the formula:

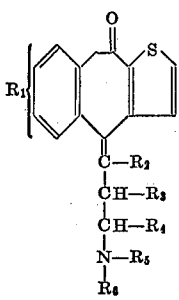

wherein
$R_1$ is hydrogen, chlorine, bromine or alkoxy of 1 to 4 carbon atoms,
$R_2$ is hydrogen,
$R_3$ and $R_4$ are each hydrogen or methyl, and
$R_5$ is alkyl of 1 to 4 carbon atoms, or
$R_5$ together with $R_2$ is an ethylene chain, or
$R_5$ together with $R_3$ is an ethylene or trimethylene chain, or
$R_5$ together with $R_4$ is a trimethylene or tetramethylene chain, and
$R_6$ is alkyl of 1 to 4 carbon atoms, or pharmaceutically acceptable acid addition salts thereof.
A novel process is provided for their production. The compounds are useful specific histaminolytics.

This invention relates to benzocycloheptathiophene derivatives.
More particularly the invention relates to new compounds of Formula I,

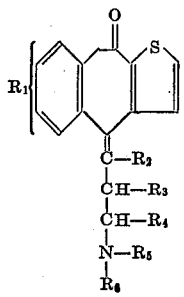

wherein
$R_1$ is hydrogen, chlorine, bromine or alkoxy of 1 to 4 carbon atoms, especially chlorine,
$R_2$ is hydrogen,
$R_3$ and $R_4$ are each hydrogen or methyl, and
$R_5$ is alkyl of 1 to 4 carbon atoms, or
$R_5$ together with $R_2$ is an ethylene chain, or
$R_5$ together with $R_3$ is an ethylene or trimethylene chain, or
$R_5$ together with $R_4$ is a trimethylene or tetramethylene chain, and
$R_6$ is alkyl of 1 to 4 carbon atoms, and acid addition salts thereof.
In accordance with the invention a compound of Formula I is obtained by a process comprising treating a compound of Formula II, $$\text{(II)}$$

wherein
$R_1$ to $R_6$ are as defined above, and
X is chlorine or bromine in the 9 or 10 position of the 4H-benzo[4,5]cyclohepta[1,2-b]thiophene structure, with a strong, aqueous, non-oxidizing acid.
The compounds of Formula I may be converted into acid addition salts, and acid addition salts into free bases in conventional manner.
Suitable strong acids for the reaction are inorganic acids, e.g. sulphuric, hydrochloric, hydrobromic and phosphoric acids, and organic acids, e.g. aliphatic and aromatic sulphonic acids, e.g. methanesulphonic and toluenesulphonic acid, trifluoroacetic and trichloroacetic acids.
Certain acids, notably nitric acid, cause oxidation of the compounds, resulting in carbonisation or charring of the reaction mixture and the degradation of the starting compounds, and accordingly should not be used.
The preferred strong acids are those which dissociate completely or substantially completely to give a pH in 1 N aqueous solution of from 0 to 1. With such acids, good yields in the process of the invention can be obtained by, for example, heating a solution of a compound of Formula II in a 20 to 70% aqueous strong acid, to about 80 to 120° C.
The reaction period may range between 1 and about 15 hours depending on the type and concentration of the acid used, and the reaction temperature.
When an extremely dilute acid or a slightly weaker acid, such as one which gives a reaction mixture having a pH of up to 3, is used, the reaction is conveniently effected at an elevated temperature, e.g. at about 200 to 230° C., and under pressure.
The compounds of Formula II are fairly or readily soluble in aqueous acids. Therefore, the addition of a solution aid is generally not essential. When a solution aid, e.g. an alkanol, is used, then it is advisable to keep the percentage of this solution aid as low as possible.

The compounds of Formula Ia,

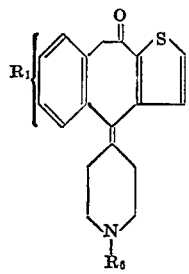
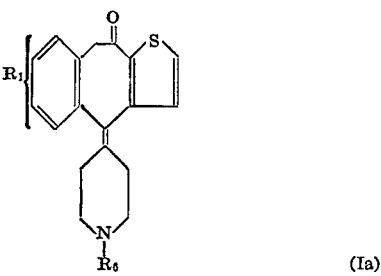
(Ia)

wherein $R_1$ and $R_6$ are as defined above, as well as processes for the production of these compounds of Formula Ia, are described in our earlier patent application No. 120,738, filed Mar. 3, 1971, which issued as U.S. Pat. 3,682,930. In accordance with said patent application the compounds of Formula Ia are obtained in two stages from the corresponding compounds of Formula II as follows: reaction with a primary or secondary amine in the presence of an acid-binding agent, or reaction with a potassium alcoholate, and subsequent hydrolysis of the resulting secondary or tertiary amine, or splitting of the resulting ether with an acid.

This previous process has the disadvantage that the production of amines or ethers yields a mixture of 4H-benzo[4,5]cyclohepta[1,2-b]thiophenes substituted in the 9 position with 4H-benzo[4,5]cyclohepta[1,2-b]thiophenes substituted in the 10 position at a ratio of approximately 2:1. The process of the present invention yields the 10-keto compounds and has advantages in purity of product and in yield.

Owing to indications in the literature concerning the exchangeability of halogen in vinylogenous halides, it was assumed that X in Formula II would be practically inert towards acid agents. Contrary to expectation, the reaction of the invention is not only feasible, but also proceeds smoothly and gives excellent yields.

The compounds of Formula Ib,

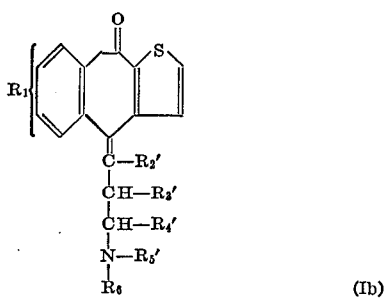
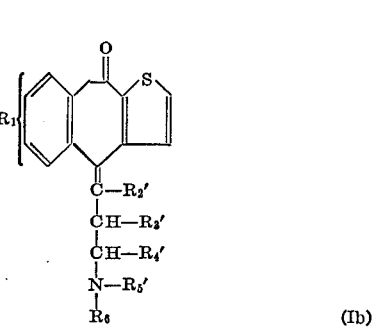
(Ib)

wherein $R_1$ and $R_6$ are as defined above,
$R_2'$ is hydrogen, and
each of $R_3'$ and $R_4'$ is hydrogen or methyl, and
$R_5'$ is alkyl of 1 to 4 carbon atoms,
or $R_5'$ together with $R_3'$ is ethylene or trimethylene,
or $R_5'$ together with $R_4'$ is trimethylene or tetramethylene,
or, when at least one of $R_3'$ and $R_4'$ is methyl, $R_5'$ together with $R_2'$ is ethylene, and their acid addition salts are new and are likewise included in the present invention.

The compounds of Formula II may, for example, be produced from compounds of Formula III,

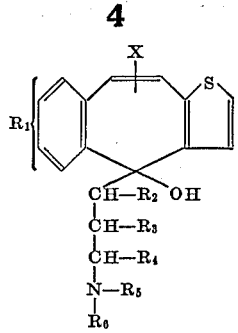
(III)

wherein X and $R_1$ to $R_6$ are as defined above, by water removal.

The compounds of Formula IIa,

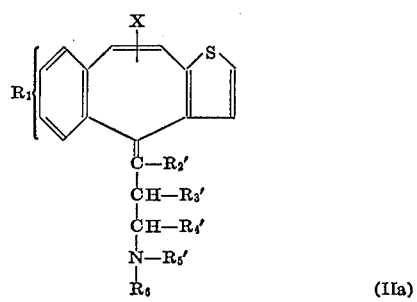
(IIa)

wherein X, $R_1$, $R_2'$, $R_3'$, $R_4'$, $R_5'$ and $R_6$ are as defined above, have hitherto not been described in the literature. They may be produced in accordance with the invention by dehydrating a compound of Formula IIIa,

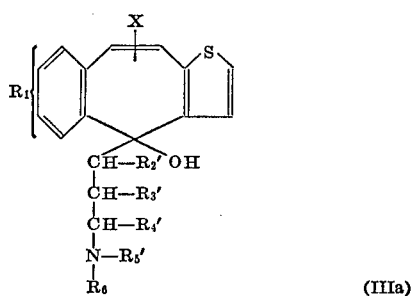
(IIIa)

wherein X, $R_1$, $R_2'$, $R_3'$, $R_4'$, $R_5'$ and $R_6$ are as defined above.

Examples of water-removing agents which may be used for water removal are: mineral acids such as sulphuric acid, ethanolic hydrochloric acid or hydrobromic acid, strong organic acids, such as acetic anhydride, or inorganic acid halides.

When an appropriate water-removing agent, i.e. a strong, aqueous, non-oxidizing acid, is used, then the compounds of Formula III may be converted into compounds of Formula I directly, i.e. without isolation of the compounds of Formula II. In this direct process variant it is likewise advisable to keep the percentage of any solution aid used as low as possible.

The compounds of Formula III, used as starting materials, are likewise new and may, for example, be produced by reacting a compound of Formula IV,

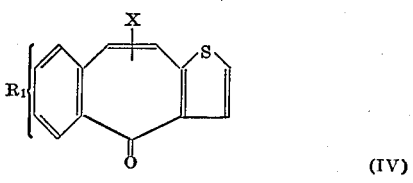
(IV)

wherein $R_1$ and X are as defined above, with an organic magnesium compound of Formula V,

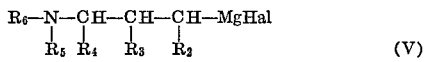

wherein $R_2$ to $R_6$ are as defined above, and
Hal is chlorine, bromine or iodine, and hydrolyzing the reaction mixture to yield a compound of Formula III.

The production of a compound of Formula III may, for example, be effected by adding dropwise a solution of a compound of Formula IV in an inert absolute organic solvent, e.g. an open chain or cyclic ether such as tetrahydrofuran or diethyl ether, to an organic magnesium halogen compound of Formula V, prepared in the same solvent, and conveniently stirring the mixture for approximately 1½ hours, preferably at room temperature. Hydrolysis is subsequently effected in the cold, preferably with an aqueous ammonium chloride solution, and extraction is suitably effected with a water-immiscible inert organic solvent, e.g. a chlorinated aliphatic hydrocarbon such as methylene chloride or chloroform.

The compounds of Formula IV have not been described in the literature, but are disclosed in our co-pending application No 120,738, filed Mar. 3, 1971, which issued as U.S. Pat. 3,683,930. They may be produced by splitting off hydrogen halide (HX, wherein X is as defined above), from a compound of Formula VI.

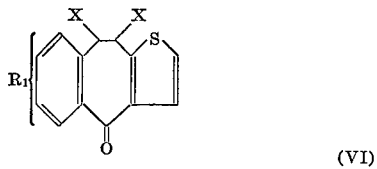

wherein $R_1$ and X are as defined above.

This splitting off is effected under alkaline conditions, e.g. by the action of a solution of potassium hydroxide in an inert organic solvent such as methanol, or by the action of a commercial solution of potassium or sodium hydroxide with the addition of a lower alcohol as solvent, and is accelerated by heating the reaction mixture.

The compounds of Formula VI may, for example, be produced by chlorinating or brominating a compound of Formula VII,

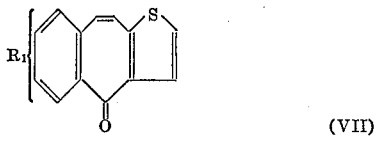

wherein $R_1$ is as defined above, in an inert organic solvent, e.g. cyclohexane, to obtain the corresponding 9,10-dichloro or 9,10-dibromo compounds. The above 9,10-dibromo compounds obtained from the compounds of Formula VII may, for example, also be obtained by reacting a compound of Formula VIII,

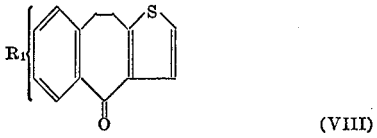

wherein $R_1$ is as defined above, with the stoichiometric amount of N-bromosuccinimide in an inert organic solvent, e.g. a chlorinated aliphatic hydrocarbon such as carbon tetrachloride.

The bromine or chlorine atom represented by the symbol X in the compounds of Formula IV and hence also in the compounds of Formulae II and III, is in the 9 or 10 position in accordance with the nuclear magnetic resonance spectrum. Owing to the good yields wherewith the compounds of Formula II give compounds of Formula I, using the process of the invention, it can in all probability be assumed that X is in the 10 position.

Insofar as the production of the starting materials is not particularly described, these are known or may be produced in accordance with known processes, or in a manner analogous to the processes described herein or to known processes.

The compounds of Formula I and pharmaceutically acceptable acid addition salts thereof are useful because they possess pharmacological activity in animals. More particularly, the compounds of Formula I are useful as specific histaminolytics, as indicated by their showing significant histaminolytic properties in the histamine toxicity test in guinea pigs, without showing any significant serotonin-antagonistic or anticholinergic properties in the serotonin and acetylcholine toxicity tests in guinea pigs. Particularly pronounced histaminolytic properties are observed with compounds of Formula Ia, especially compounds of Formula Ia, wherein $R_6$ is methyl, notably 4-(1 - methyl - 4-piperidylidene)-4H-benzo[4,5]cyclohepta-[1,2-b]thiophen-10(9H)-one and 6-chloro- and 7-chloro-4 - (1-methyl-4-piperidylidene)-4H-benzo[4,5]cyclohepta-[1,2-b]thiophen-10(9H)-one.

For use of a compound of Formula I as a specific histaminolytic, the dose to be administered will naturally vary depending on the compound employed, the mode of administration and the treatment desired. However, satisfactory results are obtained at doses between about 0.004 and 3.0 mg./kg. animal body weight. For the larger mammals, the daily dose is from about 0.5 to 200 mg. of the compound, which may be administered in divided doses 2 to 3 times a day or in sustained release form. Unit dosage forms suitable for oral administration incorporate from about 0.15 to 100 mg. of the compound, in association with a pharmaceutical carrier or diluent.

The compounds of Formula I may be administered in pharmaceutically acceptable acid addition salt form. Such salts possess the same order of activity as the free bases and are readily prepared in conventional manner. Suitable such salt forms include mineral acid salts such as the hydrochloride, hydrobromide and sulphate, and organic acid salts such as the fumarate, maleate, tartrate, methane-, ethane- and benzene-sulphonate, citrate and malate.

The compounds of Formula I or their pharmaceutically acceptable acid addition salts may be used as medicaments on their own or in the form of appropriate medicinal preparations, e.g. tablets, dragées, capsules, granules, suppositories or injectable solutions or suspensions, for enteral or parenteral administration. Aside from the usual inorganic or organic pharmacologically acceptable adjuvants, e.g. lactose, starch, talc, stearic acid, water, alcohols, natural or hardened oils and waxes, these preparations may also contain suitable preserving, stabilizing or wetting agents, solubilizers, sweetening or colouring substances and flavourings.

The compounds of Formula Ib furthermore exhibit local anesthetizing properties as indicated by tests with the cornea of rats, and are therefore indicated for use as a topical anesthetic. Satisfactory results are generally obtained in test animals or in larger mammals with 0.1 to 10% mixtures of the compounds of Formula Ib with solid or liquid carrier materials.

The invention accordingly also provides a pharmaceutical composition comprising as active agent a compound of Formula I whenever prepared by the process of the invention, or a compound of Formula Ib, or a pharmaceutically acceptable acid addition salt thereof, in association with a pharmaceutical carrier or diluent.

In the following non-limitative examples all temperatures are indicated in degrees centigrade and are uncorrected.

EXAMPLE 1

4-(1-methyl-4-piperidylidene)-4H-benzo[4,5]cyclohepta[1,2-b]thiophen-10(9)-one

A mixture of 100 g. of 9(10)-bromo-4-(1-methyl-4-piperidylidene) - 4H - benzo[4,5]cyclohepta[1,2-b]thiophene base and 900 cc. of 50% sulphuric acid is stirred at an internal temperature of 100° (oil bath temperature 110°) for 1½ hours. The reaction solution is subsequently cooled to room temperature and poured on 3000 cc. of water. The solution is subsequently rendered alkaline with 1300 cc. of concentrated caustic soda solution while cooling at 20°. The precipitated base is then extracted portionwise with 1350 cc. of chloroform. The combined chloroform extracts are washed with water, dried over sodium sulphate and concentrated by evaporation in a vacuum. The resulting crude 4-(1-methyl-4-piperidylidene) - 4H - benzo[4,5]cyclohepta[1,2 - b]thiophen-10(9H)-one base is recrystallized from 320 cc. of isopropanol. The pure 4-(1-methyl-4-piperidylidene)4H-benzo[4,5]cyclohepta[1,2-b]thiophen-10(9H)-one base, having a M.P. of 152–153°, is obtained in this manner.

The 9(10) - bromo-4-(1-methyl-4-piperidylidene)-4H-benzo[4,5]cyclohepta[1,2-b]thiophene base, used as starting material, may, for example, be produced as follows:

A mixture of 129 g. of 9,10-dihydro-4H-benzo[4,5]cyclohepta[1,2-b]thiophen-4-one, 214 g. of N-bromosuccinimide, 1.2 g. of benzoyl peroxide and 2000 cc. of absolute carbon tetrachloride is boiled under reflux for 3 hours while stirring. The reaction mixture is subsequently filtered whilst hot and the filtrate is concentrated to one third of its original volume. After allowing to stand for several hours at room temperature, the crystalline material is filtered off and dried. This crude product is recrystallized from a 7-fold quantity of chloroform. Pure 9,10-dibromo-9,10-dihydro - 4H - benzo[4,5]cyclohepta-[1,2-b]thiophen-4-one, having a M.P. of 134–135° (decomp.), is obtained in this manner. Microanalysis agrees with the formula $C_{13}H_8Br_2OS$. The structure was ascertained with the nuclear magnetic resonance spectrum.

A mixture of 70 g. of 9,10-dibromo-9,10-dihydro-4H-benzo[4,5]cyclohepta[1,2-b]thiophen-4-one, 31.6 g. of potassium hydroxide and 3200 cc. of methanol is boiled under reflux for two hours while stirring. The mixture is subsequently stirred for approximately 4 hours at 0–5° and the crystalline material is filtered off. After recrystallizing from a 100-fold quantity of methanol, pure 9(10)-bromo-4H-benzo[4,5]cyclohepta[1,2 - b]thiophen-4-one, having a M.P. of 134–135°, is obtained. Microanalysis agrees with the formula $C_{13}H_7BrOS$. The bromine atom is in the 9 or 10 position (probably 10 position) in accordance with the nuclear magnetic resonance spectrum.

5 g. of iodine-activated magnesium are covered with a layer of 15 cc. of absolute tetrahydrofuran and the mixture is heated to reflux temperature. 2 g. of freshly distilled 1-methyl-4-chloropiperidine and a few drops of 1,2-dibromoethane are subsequently added, whereby the Grignard reaction commences. 22.8 g. of freshly distilled 1-methyl-4-chloropiperidine, dissolved in 30 cc. of absolute tetrahydrofuran, are then rapidly added dropwise without heating at such a rate that the mixture boils continuously. After the dropwise addition is completed, the mixture is boiled under reflux for a further 2 hours, whereupon the magnesium is practically completely converted. A warm solution of 30 g. of 9(10)-bromo-4H-benzo[4,5]cyclohepta[1,2-b]thiophen-4-one in 160 cc. of absolute tetrahydrofuran is subsequently added dropwise at 20–25° over a period of 1 hour while cooling. After stirring at 20–25° for 1½ hours, the reaction mixture is poured on a mixture of 250 cc. of ice water and 35 g. of ammonium chloride, and the precipitated base is extracted portionwise with a total of 600 cc. of chloroform. The combined chloroform phases are washed with 50 cc. of water, dried over sodium sulphate and concentrated in a vacuum. The crude 9(10)-bromo-4-(1-methyl-4-piperidyl)-4H-benzo[4,5]cyclohepta[1,2-b]thiophen-4-ol base is obtained as residue and is used as such for the next reaction.

A solution of 51 g. of crude 9(10)-bromo-4-(1-methyl-4 - piperidyl) - 4H-benzo[4,5]cyclohepta[1,2-b]thiophen-4-ol and 420 cc. of a 14% solution of hydrobromic acid in ethanol is heated under reflux at an oil bath temperature of 100°. The reaction solution is subsequently concentrated in a vacuum and the residue is dissolved in 100 cc. of water. After rendering alkaline with concentrated caustic soda solution, the precipitated base is extracted thrice with 100 cc. of chloroform. The combined chloroform extracts are washed with 50 cc. of water, dried over sodium sulphate and concentrated by evaporation in a vacuum. The residue is dissolved in 70 cc. of chloroform containing 5% of methanol, and the solution is adsorbed on 1000 g. of silica gel. Elution is effected with chloroform containing 5% of methanol. The first 8 liters of eluate are discarded, the following 4 liters are concentrated together by evaporation. An oily evaporation residue is obtained, which is dissolved at the boil in 50 cc. of isopropanol and allowed to crystallize over night at 0–5°. After filtering off the crystalline material and drying, the pure 9(10) - bromo - 4-(1-methyl-4-piperidylidene) - 4H - benzo[4,5]cyclohepta[1,2-b]thiophene base, having a M.P. of 149–150°, is obtained. Microanalysis agrees with the formula $C_{19}H_{18}BrNS$. The bromine atom is in the 9 or 10 position (probably in the 10 position) in accordance with the nuclear magnetic resonance spectrum.

EXAMPLE 2

4-(1-methyl-4-piperidylidene)-4H-benzo[4,5]cyclohepta[1,2-b]thiophen-10(9H)-one

A solution of 10 g. of 9(10)-bromo-4-(1-methyl-4-piperidylidene) - 4H - benzo[4,5]cyclohepta[1,2-b]thiophen-4-ol in 100 cc. of 50% sulphuric acid is stirred at 100° for 1½ hours. The reaction solution is poured on 400 cc. of ice water and is subsequently rendered alkaline with concentrated caustic soda solution. The precipitated base is subsequently extracted portionwise with 400 cc. of chloroform. The combined extracts are washed with 100 cc. of water, dried over sodium sulphate and concentrated in a vacuum. The resulting crude base is recrystallized from 25 cc. of isopropanol. The title compound, having a M.P. of 152–153°, is obtained.

EXAMPLE 3

6-chloro-4-(1-methyl-4-piperidylidene)-4H-benzo-[4,5]cyclohepta[1,2-b]thiophen-10(9H)-one A mixture of 10 g. of 9(10) - bromo-6-chloro-4-(1-methyl - 4 - piperidylidene) - 4H-benzo[4,5]cyclohepta-[1,2-b]thiophene base and 110 cc. of 60% sulphuric acid is stirred at 85–90° for 3 hours. The reaction solution is subsequently poured on 300 g. of ice and rendered alkaline with concentrated caustic soda solution while cooling at 20°. The precipitated base is extracted portionwise with a total of 200 cc. of chloroform. The combined extracts are washed with water, dried over sodium sulphate and concentrated to dryness. The solid evaporation residue is recrystallized from 50 cc. of ethyl acetate. The pure 6-chloro - 4 - (1 - methyl - 4-piperidylidene)-4H-benzo-[4,5]cyclohepta [1,2-b]thiophen-10(9H)-one base, having a M.P. of 168–169°, is obtained in this manner. Microanalysis agrees with the formula $C_{19}H_{18}ClNOS$. The structure was ascertained with the infrared, nuclear magnetic resonance and mass spectrograph spectra.

The 9(10) -bromo - 6 - chloro-4-(1-methyl-4-piperidylidene) - 4H - benzo[4,5]cyclohepta[1,2-b]thiophene base, required as starting material, is produced from 6-chloro-9,10 - dihydro-4H-benzo[4,5]cyclohepta[1,2-b]thiophen- 4-one. The following intermediates were isolated during the course of the process:

6-chloro-9,10-dibromo-9,10-dihydro-4H-benzo[4,5]cyclo- hepta[1,2-b]thiophen-4-one (decomposition point 147– 149°), 9(10)-bromo-6-chloro-4H-benzo[4,5]cyclohepta[1,2-b] thiophen-4-one (M.P. 198–200°), 9(10)-bromo-6-chloro-4-(1-methyl-4-piperidyl)-4H- benzo[4,5]cyclohepta[1,2-b]thiophen-4-ol base (worked up as such in crude state), 9(10)-bromo-6-chloro-4-(1-methyl-4-piperidylidene)-4H- benzo[4,5]cyclohepta[1,2-b]thiophene base (M.P. 193– 195°).

EXAMPLE 4

7-chloro-4-(1-methyl-4-piperidylidene)-4H-benzo- [4,5]cyclohepta[1,2-b]thiophen-10(9)-one A mixture of 10 g. of 9(10)-bromo - 7 - chloro-4-(1- methyl - 4 - piperidylidene) - 4H - benzo[4,5]cyclohepta- [1,2-b]thiophene base and 100 cc. of 60% sulphuric acid is stirred at 100–105° for 1½ hours. The reaction mixture is subsequently poured on 300 g. of ice and rendered alkaline with concentrated ammonia at 20–25° while cooling. The precipitated base is extracted portionwise with a total of 300 cc. of chloroform. The combined extracts are washed with water, dried over sodium sulphate and concentrated in a vacuum. The evaporation residue is dissolved in chloroform and adsorbed on 250 g. of silica gel. Elution is effected with chloroform containing 5% of methanol. The first 0.6 liter of eluate are discarded, the following 0.8 liter are concentrated separately to dryness. The solid evaporation residue is recrystallized from a 4-fold quantity of isopropanol. The pure 7-chloro- 4-(1-methyl - 4 - piperidylidene) - 4H - benzo[4,5]cyclo- hepta[1,2-b]thiophen - 10(9H) - one base, having a M.P. of 150–151°, is obtained in this manner. Microanalysis agrees with the formula $C_{19}H_{18}ClNOS$. The structure was ascertained with the infrared, nuclear magnetic resonance and mass spectrograph spectra.

The 9(10) - bromo - 7 - chloro - 4 - (1 - methyl-4- piperidylidene) - 4H - benzo[4,5]cyclohepta[1,2-b]thio- phene base, used as starting material, was obtained from 7-chloro - 9,10 - dihydro - 4H - benzo[4,5]cyclohepta- [1,2-b]thiophen-4-one.

The following intermediates were isolated during the course of the process:

7-chloro - 9,10 - dibromo - 9,10 - dihydro-4H-benzo[4,5] cyclohepta[1,2-b]thiophen - 4 - one (used for the next reaction in crude state), 9(10)-bromo-7-chloro-4H-benzo[4,5]cyclohepta[1,2-b] thiophen-4-one (M.P. 218–220°), 9(10)-bromo - 7 - chloro - 4 - (1-methyl-4-piperidyl)- 4H-benzo[4,5]cyclohepta[1,2-b]thiophen - 4 - ol base (oily, used for the next reaction in crude state), 9(10)-bromo-7-chloro-4-(1-methyl - 4 - piperidylidene)- 4H - benzo[4,5]cyclohepta[1,2-b]thiophene base (M.P. 147–149°).

EXAMPLE 5

6-bromo-4-(1-methyl-4-piperidylidene)-4H-benzo- [4,5]cyclohepta[1,2-b]thiophen-10(9H)-one A mixture of 15 g. of 6,9(10)-dibromo - 4 - (1-methyl- piperidylidene) - 4H - benzo[4,5]cyclohepta[1,2-b]thio- phene base and 160 cc. of 60% sulphuric acid is stirred at an internal temperature of 100° for 1½ hours. The reaction mixture is subsequently diluted with 200 cc. of water and rendered alkaline with concentrated ammonia at 20–25° while cooling. The precipitated base is extracted portionwise with a total of 400 cc. of toluene. The combined extracts are washed with water, dried over sodium sulphate and concentrated in a vacuum. The evaporation residue is dissolved in chloroform and adsorbed on 500 g. of silica gel. Elution is effected with chloroform containing 2% of methanol. The first 2.5 liters of eluate are discarded, the following 2.7 liters are concentrated separately to dryness. The solid evaporation residue is recrystallized from an 8-fold quantity of isopropanol. The pure 6-bromo - 4 - (1-methyl-4- piperidylidene) - 4H - benzo[4,5]cyclohepta[1,2-b]thio- phen - 10(9H) - one base, having a M.P. of 172–173°, is obtained in this manner. Microanalysis agrees with the formula $C_{19}H_{18}BrNOS$. The structure was ascertained with the infrared and nuclear magnetic resonance spectra.

The 6,9(10) - dibromo - 4 - (1 - methyl-4-piperidylid- ene) - 4H - benzo[4,5]cyclohepta[1,2-b]thiophene base, required as starting material, is obtained from 6-bromo- 9,10 - dihydro - 4H - benzo[4,5]cyclohepta[1,2-b]thio- phen-4-one.

The following intermediates were isolated during the course of the process:

9,10-dihydro - 6,9,10 - tribromo - 4H - benzo[4,5]cyclo- hepta[1,2-b]thiophen - 4 - one (used for the next reaction in crude state), 6,9(10)-dibromo-4H-benzo[4,5]cyclohepta[1,2-b] thiophen-4-one (M.P. 177–190°), 6,9(10)-dibromo - 4 - (1 - methyl - 4 - piperidyl)-4H- benzo[4,5]cyclohepta[1,2-b]thiophen-4-ol base (oily, used for the next reaction in crude state), 6,9(10) - dibromo - 4 - (1 - methyl - 4 - piperidylidene)- 4H-benzo[4,5]cyclohepta[1,2-b]thiophene base (M.P. 185–186°).

EXAMPLE 6

4-(3-dimethylaminopropylidene)-4H-benzo[4,5]cy- clohepta[1,2-b]thiophen-10(9H)-one 72.2 g. of 9(10)-bromo - 4 - (3-dimethylaminopropyl- idene) - 4H - benzo[4,5]cyclohepta[1,2-b]thiophene base are dissolved in 720 cc. of 50% sulphuric acid at 50°, and the solution is subsequently stirred at 100° for 1½ hours. The reaction mixture is subsequently poured on 1500 cc. of water and rendered alkaline with concentrated caustic soda solution at 20–30° while cooling. The precipitated base is extracted portionwise with a total of 1500 cc. of chloroform. The chloroform phase is washed with water, dried over sodium sulphate and concentrated by evaporation. An oily crude base is obtained as residue. 38 g. of this crude base are dissolved at the boil in 200 cc. of isopropanol and acidified with hydrochloric acid in isopropanol. The hydrochloride which crystallizes is allowed to stand at 0–5° for several hours, is filtered off and subsequently recrystallized from a 20-fold quantity of isopropanol. The pure mixture of $\alpha,\beta$ isomers of 4-(3- dimethylaminopropylidene) - 4H - benzo[4,5]cyclohepta- [1,2-b]thiophen - 10(9H) - one hydrochloride, having a M.P. of 214–216° (decomp.), is obtained in this manner. Microanalysis agrees with the formula $C_{18}H_{19}NOS \cdot HCl$. The structure was ascertained with the infrared and nuclear magnetic resonance spectra. The $\alpha:\beta$ isomer ratio (cis/trans isomerism) is approximately 80:20 in accordance with the nuclear magnetic resonance spectrum.

The pure $\alpha$ isomer is produced by dissolving 35 g. of the oily crude base in 350 cc. of methanol at the boil and adding a hot solution of 10.6 g. of oxalic acid in 150 cc. of methanol. After allowing to stand over night at room temperature, the oxalate is filtered off, dissolved at the boil in 1400 cc. of methanol, filtered, and 1500 cc. of petroleum ether are added to the filtrate at room temperature. After allowing to stand over night at 0–5°, the crystalline product is filtered off and is again recrystallized from methanol/petroleum ether (1:1). The pure $\alpha$ isomer of 4-(3-dimethylaminopropylidene)-4H-benzo [4,5]cyclohepta[1,2-b]thiophen - 10(9H) - one oxalate, having a decomposition point of 198–199°, is obtained in this manner. Microanalysis agrees with the formula $$C_{18}H_{19}NOS \cdot C_2H_2O_4$$

The corresponding hydrochloride is obtained from this oxalate as follows: 11 g. of oxalate are suspended in 100 cc. of water and the suspension is rendered alkaline with 3 N caustic soda solution. The free base is extracted portionwise with 150 cc. of chloroform. The chloroform extracts are washed with water, dried over sodium sulphate and concentrated in a vacuum. An oily base is obtained as residue. 8.7 g. of this base are dissolved at the boil in 80 cc. of isopropanol and acidified with hydrochloric acid in isopropanol. After allowing to stand over night at 0–5°, the hydrochloride which crystallizes is filtered off and dried in a vacuum at 70–80°. The pure α isomer of 4-(3-dimethylaminopropylidene) - 4H - benzo[4,5] cyclohepta[1,2-b]thiophen-10(9H) - one hydrochloride, having a M.P. of 220–221° (decomp.), is thus obtained. Microanalysis agrees with the formula $C_{18}H_{19}NOS \cdot HCl$. The structure was ascertained with the infrared and nuclear magnetic resonance spectra.

The 9(10 - bromo - 4 - (3-dimethylaminopropylidene)-4H-benzo[4,5]cyclohepta[1,2-b]thiophene base, required as starting material, is produced as follows:

33 g. of iodine-activated magnesium filings are covered with a layer 200 cc. of absolute tetrahydrofuran, and approximately 30 cc. of a solution of 217 g. of freshly distilled 3-dimethylaminopropyl chloride in 200 cc. of absolute tetrahydrofuran are added. The Grignard reaction commences by the addition of a few drops of 1,2-dibromoethane. The remainder of the 3-dimethylaminopropyl chloride solution is then rapidly added dropwise to the magnesium at such a rate that the reaction mixture boils continuously without external heating. After the dropwise addition is completed, the reaction mixture is boiled under reflux for a further 1½ hours, whereupon the magnesium is completely dissolved. The reaction mixture is cooled to 10°, and a warm solution of 200 g. of 9(10)-bromo-4H-benzo[4,5]cyclohepta[1,2-b]thiophen - 4 - one in 1000 cc. of absolute tetrahydrofuran is added dropwise at this temperature over a period of half an hour. The reaction mixture is subsequently stirred at 15–20° for 1½ hours, is then poured on a mixture of 1500 g. of ice and 200 g. of ammonium chloride and extracted once with 500 cc. and thrice with 200 cc. of chloroform. The combined extracts are washed thrice with 100 cc. amounts of water, are dried over sodium sulphate and concentrated. The solid evaporation residue is recrystallized from 1500 cc. of isopropanol. The pure 9(10)-bromo-4-(3-dimethylaminopropyl) - 4H - benzo[4,5]cyclohepta[1,2-b]thiophen-4-ol base, having a M.P. of 127–128°, is obtained in this manner. Microanalysis agrees with the formula $C_{18}H_{20}BrNOS$.

250 cc. of 63% aqueous hydrobromic acid are added at 20° while cooling to a suspension of 227 g. of 9(10)-bromo-4-(3 - dimethylaminopropyl) - 4H - benzo[4,5] cyclohepta[1,2-b]thiophen-4-ol in 870 cc. of isopropanol. The mixture is subsequently stirred at 60° for half an hour and is then rendered alkaline with 275 cc. of concentrated caustic soda solution at 20° while cooling. The isopropanol is then distilled off in a vacuum, and the resulting aqueous suspension is extracted portionwise with a total of 850 cc. of chloroform. The combined chloroform extracts are washed with water, are dried over sodium sulphate and concentrated. The residue is an oily base which is distilled in a high vacuum. The pure 9(10)-bromo-4-(3-dimethylaminopropylidene - 4H - benzo[4,5] cycloheptal[1,2-b]thiophene base, having a B.P. of 168–174° at 0.02 mm. of Hg, is obtained in this manner. Microanalysis agrees with the formula $C_{18}H_{18}BrNS$. In accordance with the nuclear magnetic resonance spectrum it is a mixture of isomers of the α and β form (cis/trans isomerism). The α:β ratio is approximately 60:40.

EXAMPLE 7

7-methoxy-4-(1-methyl-4-piperidylidene)-4H-benzo[4,5]cyclohepta[1,2-b]thiophen-10(9H)-one A mixture of 8 g. of oily 9(10)-bromo-7-methoxy-4-(1-methyl-4-piperidylidene) - 4H - benzo[4,5]cyclohepta[1, 2-b]thiophene base and 250 cc. of 60% sulphuric acid is stirred at an internal temperature of 100° for 1½ hours. The reaction mixture is subsequently poured on 600 g. of ice, is rendered alkaline with concentrated ammonia, and the precipitated base is extracted several times with chloroform. The combined extracts are washed with water, dried over sodium sulphate and concentrated. The evaporation residue is recrystallized once from a 5-fold quantity of ethyl acetate and once from a10-fold quantity of isopropanol. The pure 7-methoxy-4-(1-methyl-4-piperidylidene)-4H-benzo[4,5]cyclohepta[1,2-b]thiophen - 10(9H) - one base, having a M.P. of 157–158°, is obtained in this manner. Microanalysis agrees with the formual $C_{20}H_{21}NO_2S$. The structure was ascertained with the infrared, nuclear magnetic resonance and mass spectrograph spectra.

The 9(10-bromo - 7 - methoxy-4-(1-methyl - 4 - piperidylidene) - 4H - benzo[4,5]cyclohepta[1,2-b]thiophene base, required as starting material, is obtained from 4-methoxyphthalaldehydic acid. The following intermediates are isolated during the course of the process:

4-methoxy-2-[2-(2-thienyl)vinyl]benzoic acid (M.P. 170–172°), 4-methoxy-2-[2-(2-thienyl)ethyl]benzoic acid (used for the next reaction in crude state), 9,10-dihydro-7-methoxy-4H-benzo[4,5]cyclohepta[1,2-b]thiophen-4-one (used for the next reaction in crude state), 9,10-dibromo-9,10-dihydro-7-methoxy-4H-benzo[4,5] cyclohepta[1,2-b]thiophen-4-one (used for the next reaction in crude state), 9(10)-bromo-7-methoxy-4H-benzo[4,5]cyclohepta[1,2-b]thiophen-4-one (M.P. 182–184°), 9(10)-bromo-7-methoxy-4-(1-methyl-4-piperidyl)-4H-benzo[4,5]cyclohepta[1,2-b]thiophen-4-ol (used for the next reaction in crude state).

EXAMPLE 8

6-chloro-4-(3-dimethylaminopropylidene)-4H-benzo[4,5]cyclohepta[1,2-b]thiophen-10(9H)-one A mixture of 57.8 g. of oily 9(10)-bromo-6-chloro-4-(3 - dimethylaminopropylidene) - 4H - benzo[4,5]cyclohepta[1,2-b]thiophene base and 580 cc. of 60% sulphuric acid is stirred at an internal temperature of 100° for 1 hour. The reaction mixture is subsequently poured on 2000 g. of ice, is rendered alkaline with concentrated caustic soda solution, and the free base is extracted portionwise with a total of 700 cc. of chloroform. The combined extracts are washed with water, dried over sodium sulphate and concentrated. The residue is dissolved in a small amount of chloroform and adsorbed on 1000 g. of silica gel. Elution is effected with chloroform containing 2% of methanol. The first 3.5 liters of eluate are discarded, the following 8 liters are concentrated separately. An oily base is obtained as residue.

The hydrochloride is produced by dissolving 30 g. of this base at the boil in 120 cc. of isopropanol, acidifying with hydrochloric acid in isopropanol and crystallizing overnight at 0–5°. The salt is subsequently filtered off and dried in a vacuum at 80°. The pure mixture of α,β isomers of 6-chloro-4-(3-dimethylaminopropylidene) - 4H-benzo[4,5]cyclohepta[1,2-b]thiophen-10(9H) - one hydrochloride, having a M.P. of 212–214°, is obtained in this manner. Microanalysis agrees with the formula $$C_{18}H_{18}ClNOS \cdot HCl$$

The structure was ascertained with the infrared and nuclear magnetic resonance spectra. The α:β isomer ratio is approximately 87:13.

The 9(10) - bromo-6-chloro-4-(3 - dimethylaminopropylidene) - 4H - benzo[4,5]cyclohepta[1,2 - b]thiophene base, required as starting material, is obtained from 6-chloro-9,10-dihydro - 4H - benzo[4,5]cyclohepta[1,2-b] thiophen-4-one.

The following intermediates were isolated during the course of the process:

6-chloro-9,10-dibromo-9,10-dihydro-4H-benzo[4,5]
cyclohepta[1,2-b]thiophen-4-one (decomposition point 147–149°),
9(10)-bromo-6-chloro-4H-benzo[4,5]cyclohepta[1,2-b]thiophen-4-one (M.P. 198–200°),
9(10)-bromo-6-chloro-4-(3-dimethylaminopropyl)-4H-benzo[4,5]cyclohepta[1,2-b]thiophen-4-ol (M.P. 142–144°).

The pure 9(10)-bromo-6-chloro-4-(3-dimethylaminopropylidene)-4H-benzo[4,5]cyclohepta[1,2 - b]thiophene base has a B.P. of 191–195° at 0.06 mm. of Hg.

EXAMPLE 9

4-(1-ethyl-4-piperidylidene)-4H-benzo[4,5]cyclohepta[1,2-b]thiophen-10(9H)-one

A mixture of 10 g. of 4-(1-ethyl-4-piperidylidene)-9(10) - bromo-4H-benzo[4,5]cyclohepta[1,2-b]thiophene base and 100 cc. of 50% sulphuric acid is stirred at an internal temperature of 100° for 1½ hours. The solution is subsequently cooled to room temperature, diluted with 300 cc. of water and rendered alkaline with concentrated ammonia. The precipitated base is extracted with chloroform. The chloroform solution is washed with water, dried over sodium sulphate and concentrated. The residue is recrystallized from a 3-fold quantity of isopropanol. The pure 4-(1-ethyl-4-piperidylidene)-4H-benzo[4,5]cyclohepta[1,2-b]thiophen-10(9H)-one base, having a M.P. of 113–115°, is obtained in this manner. Microanalysis agrees with the formula $C_{20}H_{21}NOS$. The structure was ascertained with the infrared and nuclear magnetic resonance spectra.

The 4-(1-ethyl - 4 - piperidylidene)-9(10)-bromo-4H-benzo[4,5]cyclohepta[1,2-b]thiophene base (M.P. 130–132°), required as starting material, is obtained from 9(10)-bromo - 4H-benzo[4,5]cyclohepta[1,2-b]thiophen-4-one. The 4-(1-ethyl - 4 - piperidyl)-9(10)-bromo-4H-benzo[4,5]cyclohepta[1,2-b]thiophen-4-ol base, isolated during the course of the process, is used for the next reaction in crude state.

EXAMPLE 10

4-(1-isopropyl-4-piperidylidene)-4H-benzo[4,5]cyclohepta[1,2-b]thiophen-10(9H)-one The process is effected as described in Example 9, except that the 9(10)-bromo-4-(1-isopropyl-4-piperidylidene)-4H-benzo[4,5]cyclohepta[1,2-b]thiophene base is used as starting material in place of the 4-(1-ethyl-4-piperidylidene)-9(10)-bromo-4H - benzo[4,5]cyclohepta-[1,2-b]thiophene base. The hydrogen fumarate of the title compound is recrystallized from ethanol and has a M.P. of 225–226° (decomp.).

The 9(10)-bromo-4-(1-isopropyl-4-piperidylidene)-4H-benzo[4,5]cyclohepta[1,2-b]thiophene base, required as starting material, is obtained from 9(10)-bromo-4H-benzo[4,5]cyclohepta[1,2-b]thiophen - 4 - one. The 9(10)-bromo-4-(1-isopropyl-4-piperidyl) - 4H - benzo[4,5]cyclohepta[1,2-b]thiophen-4-ol base, isolated during the course of the process, is used for the next reaction in crude state.

EXAMPLE 11

4-[(1-methyl-3-piperidyl)methylene]-4H-benzo[4,5]cyclohepta[1,2-b]thiophen-10(9H)-one A mixture of 54 g. of crude 9(10)-bromo-4-[(1-methyl - 3 - piperidyl)methylene] - 4H - benzo[4,5]cyclohepta[1,2-b]thiophene base and 540 cc. of 50% sulphuric acid is stirred at an internal temperature of 100° for 6½ hours. The reaction mixture is subsequently rendered alkaline with concentrated ammonia at 20–30° while cooling, and the precipitated base is extracted with chloroform. The chloroform solution is washed with water, dried over sodium sulphate and concentrated.

The hydrogen maleate is produced by dissolving 37.7 g. of the evaporation residue in 280 cc. of absolute ethanol and adding a hot solution of 14.2 of maleic acid in 100 cc. of absolute ethanol. After allowing to stand over night at 0–5°, the salt is filtered off and dried in a vacuum. The pure mixture of α,β isomers of 4-[(1-methyl-3-piperidyl)methylene] - 4H - benzo[4,5]cyclohepta[1,2-b]thiophen-10(9H)-one hydrogen maleate, having a M.P. of 186–188° (decomp.), is obtained in this manner. Microanalysis agrees with the formula $C_{20}H_{21}NOS·C_4H_4O_4$. The α:β isomer ratio is 55:45 in accordance with the nuclear magnetic resonance spectrum.

The 9(10)-bromo-4-[(1-methyl - 3 - piperidyl)methylene]-4H-benzo[4,5]cyclohepta[1,2-b]thiophene base, required as starting material, is obtained as follows:

15 g. of 3-chloromethyl-1-methylpiperidine are added dropwise to a mixture of 16.7 g. of iodine-activated magnesium and 70 cc. of absolute tetrahydrofuran. The Grignard reaction commences by the addition of a few drops of 1,2-dibromoethane. 115.3 g. of 3-chloromethyl-1-methylpiperidine, dissolved in 250 cc. of absolute tetrahydrofuran, are subsequently added dropwise to the magnesium at such a rate that the reaction mixture boils continuously under reflux without external heating. The mixture is subsequently boiled under reflux for 1½ hours. After cooling to 10°, a warm solution of 100 g. of 9(10)-bromo-4H-benzo[4,5]cyclohepta[1,2-b]thiopen-4-one in 500 cc. of absolute tetrahydrofuran is added dropwise at 10–15° over a period of half an hour while cooling. The reaction mixture is subsequently stirred at 10–20° for 1½ hours and is poured on 700 g. of ice containing 80 g. of ammonium chloride. The product is extracted with chloroform. After washing with water, the chloroform solution is dried over sodium sulphate and the solvent evaporated. The evaporation residue is recrystallized from a 90-fold quantity of ethyl acetate. The pure 9(10)-bromo-4[(1-methyl-3-piperidyl)-methyl] - 4H - benzo[4,5]cyclohepta[1,2-b]thiophen-4-ol base, having a M.P. of 196–208°, is obtained in this manner. Microanalysis agress with the formula $C_{20}H_{22}BrNOS$.

A mixture of 90 g. of 9(10) - bromo-4[(1-methyl-3-piperidyl)methyl]-4H-benzo[4,5]cyclohepta[1,2 - b]thiophen-4-ol base, 400 cc. of isopropanol and 160 cc. of 63% aqueous hydrobromic acid is stirred at an internal temperature of 60° for half an hour. The reaction mixture is subsequently rendered alkaline with concentrated caustic soda solution at 20–25° while cooling. After removing the isopropanol by evaporation, the free base is extracted with chloroform. The chloroform solution is washed with water, is dried over sodium sulphate and concentrated. The crude, oily 9(10)-bromo-4[(1-methyl-3-piperidyl)methylene]-4H-benzo[4,5]cyclohepta[1,2 - b]thiophene base is obtained as residue and is used as such for the next reaction.

EXAMPLE 12

4-[2-(1-methyl-2-pyrrolidyl)ethylidene]-4H-benzo[4,5]cyclohepta[1,2-b]thiophen-10(9H)-one A mixture of 40 g. of 9(10)-bromo-4-[2-(1-methyl-2-pyrrolidyl)ethylidene] - 4H - benzo[4,5]cyclohepta[1,2-b]thiophene base and 400 cc. of 50% sulphuric acid is stirred at an internal temperature of 100° for 2 hours. The reaction mixture is subsequently rendered alkaline with concentrated ammonia at 20–30° while cooling and the precipitated base is extracted with chloroform. The chloroform solution is washed with water, dried over sodium sulphate and concentrated.

The hydrochloride is produced by dissolving 25 g. of the evaporation residue in 75 cc. of isopropanol and acidifying with hydrochloric acid in isopropanol. After allowing to stand over night at 0–5°, the salt is filtered off and subsequently dried at 80° in a vacuum. The pure mixture of α,β isomers of 4-[2-(1-methyl-2-pyrrolidyl)ethylidene]-4H-benzo[4,5]cyclohepta[1,2-b]thiophen - 10(9H) - one hydrochloride, having a M.P. of 218–220°, is obtained in this manner. Microanalysis agrees with the formula $$C_{20}H_{21}NOS \cdot HCl$$

The α:β isomer ratio is 60:40 in accordance with the nuclear magnetic resonance spectrum.

The 9(10) - bromo-4-[2-(1-methyl-2-pyrrolidyl)ethylidene] - 4H - benzo[4,5]cyclohepta[1,2-b]thiophene base, required as starting material, is obtained as follows:

10 g. of 2-(2-chloroethyl) - 1 - methylpyrrolidine are added dropwise to a mixture of 16.7 g. of iodine-activated magnesium and 100 cc. of absolute tetrahydrofuran. The Grignard reaction commences by the addition of a few drops of 1,2-dibromoethane. 121.8 g. of 2-(2-chloroethyl) 1-methylpyrrolidine, dissolved in 100 cc. of absolute tetrahydrofuran, are subsequently added dropwise to the magnesium at such a rate that the reaction mixture boils continuously under reflux without external heating. The mixture is subsequently boiled under reflux for 1½ hours. After cooling to 10°, a warm solution of 100 g. of 9(10)-bromo-4H-benzo[4,5]cyclohepta[1,2-b]thiophen-4-one in 500 cc. of absolute tetrahydrofuran is added dropwise at 10–15° over a period of half an hour while cooling. The reaction mixture is subsequently stirred at 10–20° for 1½ hours and is poured on 700 g. of ice containing 80 g. of ammonium chloride. The product is extracted with chloroform. After washing with water, the chloroform solution is dried over sodium sulphate and concentrated. The crude, oily 9(10) - bromo-4-[2-(1-methyl-2-pyrrolidyl)-ethyl]-4H-benzo[4,5]cyclohepta[1,2-b]thiophen-4-ol base is obtained as evaporation residue and is used as such for the next reaction.

A mixture of 150 g. of 9(10)-bromo-4-[2-(1-methyl-2-pyrrolidyl)ethyl - 4H - benzo[4,5]cyclohepta[1,2-b]thiophen-4-ol base, 600 cc. of isopropanol and 150 cc. of 63% aqueous hydrobromic acid is boiled under reflux for half an hour. The mixture is subsequently rendered alkaline with concentrated caustic soda solution at 20–25° while cooling. After removing the isopropanol by evaporation, the free base is extracted with chloroform. The chloroform solution is washed with water, dried over sodium sulphate and concentrated. The evaporation residue is distilled in a high vacuum. The pure, oily 9(10)-bromo - 4 - [2-(1-methyl-2-pyrrolidyl)-ethylidene]-4H-benzo[4,5]cyclohepta[1,2-b]thiophene base, having a B.P. of 180–186° at 0.01 mm. of Hg, is obtained in this manner. Microanalysis agrees with the formula $C_{20}H_{20}BrNS$.

EXAMPLE 13

4-(1-n-butyl-4-piperidylidene)-4H-benzo[4,5]cyclohepta[1,2-b]thiophen-10(9H)-one The process is effected as described in Example 9, except that the 9(10)-bromo-4-(1-n-butyl-4-piperidylidene))-4H-benzo[4,5]cyclohepta[1,2-b]thiophene base is used as starting material in place of the 4-(1-ethyl-4-piperidylidene) - 9(10)-bromo-4H-benzo[4,5]cyclohepta[1,2-b]thiophene base. The pure title compound has a M.P. of 104–105° (from isopropanol).

The 9(10)-bromo - 4 - (1-n-butyl - 4 - piperidylidene)-4H-benzo[4,5]cyclohepta[1,2-b]thiophene base, required as starting material, is obtained from 9(10)-bromo-4H-benzo[4,5]cyclohepta[1,2-b]thiophen-4-one. The 9(10)-bromo - 4 - (1-n-butyl-4-piperidyl)-4H-benzo[4,5]cyclohepta[1,2-b]thiophen-4-ol base, isolated during the course of the process, is used for the next reaction in crude state.

EXAMPLE 14

4-(1-methyl-4-piperidylidene)-4H-benzo[4,5]cyclohepta[1,2-b]thiophen-10(9H)-one

The process is effected as described in Example 9, except that the 9(10)-bromo-4-(1-methyl-4-piperidylidene)-4H-benzo[4,5]cyclohepta[1,2-b]thiophene base is used as starting material in place of the 4-(1-ethyl-4-piperidylidene)-9(10)-bromo - 4H - benzo[4,5]cyclohepta[1,2-b] thiophene base, and 25% sulphuric acid is used in place of 50% sulphuric acid, and after heating for 15 hours, the title compound, having a M.P. of 152–153°, is obtained.

EXAMPLE 15

4-(1-methyl-4-piperidylidene)-4H-benzo[4,5]cyclohepta[1,2-b]thiophen-10(9H)-one

The process is effected as described in Example 14, except that 50% methanesulphonic acid is used in place of 25% sulphuric acid, and after heating for 3 hours, the title compound, having a M.P. of 152–153°, is obtained.

EXAMPLE 16

4-(1-methyl-4-piperidylidene)-4H-benzo[4,5]cyclohepta[1,2-b]thiophen-10(9H)-one

The process is effected as described in Example 14, except that 50% toluenesulphonic acid is used in place of 25% sulphuric acid, and after heating for 15 hours, the title compound, having a M.P. of 152–153°, is obtained.

EXAMPLE 17

4-(1-methyl-4-piperidylidene)-4H-benzo[4,5]cyclohepta[1,2-b]thiophen-10(9H)-one

The process is effected as described in Example 14, except that 18% hydrochloric acid is used in place of 25% sulphuric acid, and after heating for 3 hours, the title compound, having an M.P. of 152–153°, is obtained.

EXAMPLE 18

4-(1-methyl-4-piperidylidene)-4H-benzo[4,5]cyclohepta[1,2-b]thiophen-10(9H)-one

The process is effected as described in Example 14, except that 63% hydrobromic acid is used in place of 25% sulphuric acid, and after heating for 1½ hours, the title compound, having an M.P. of 152–153°, is obtained.

EXAMPLE 19

4-(1-methyl-4-piperidylidene)-4H-benzo[4,5]cyclohepta[1,2-b]thiophen-10(9H)-one

The process is effected as described in Example 14, except that 30% hydrobromic acid is used in place of 25% sulphuric acid, and after heating for 15 hours, the title compound, having an M.P. of 152–153°, is obtained.

EXAMPLE 20

4-(1-methyl-4-piperidylidene)-4H-benzo[4,5]cyclohepta[1,2-b]thiophen-10(9H)-one

The process is effected as described in Example 14, except that 40% phosphoric acid is used in place of 25% sulphuric acid, and after heating for 15 hours, the title compound, having an M.P. of 152–153°, is obtained.

EXAMPLE 21

4-(1-methyl-4-piperidylidene)-4H-benzo[4,5]cyclohepta[1,2-b]thiophen-10(9H)-one

The process is effected as described in Example 14, except that 50% trifluoroacetic acid is used in place of 25% sulphuric acid, and after heating to 120° for 15 hours, the title compound, having an M.P. of 152–153°, is obtained.

EXAMPLE 22

4-(1-methyl-4-piperidylidene)-4H-benzo[4,5]cyclohepta[1,2-b]thiophen-10(9H)-one

The process is effected as described in Example 14, except that 50% trichloroacetic acid is used in place of 25% sulphuric acid, and after heating to 100° for 15 hours, the title compound, having an M.P. of 152–153°, is obtained.

EXAMPLE 23

4-(1-methyl-4-piperidylidene)-4H-benzo[4,5]cyclohepta-[1,2-b]thiophen-10(9H)-one The process is effected as described in Example 14, except that 1 mol of sulphuric acid in a 20-fold quantity of water is used in place of 25% sulphuric acid for every mol of 9(10)-bromo-4-(1 - methyl - 4 - piperidylidene)-4H-benzo[4,5]cyclohepta[1,2-b]thiophene base, and after heating to 230° for 6 hours at 21 atmospheres, the title compound, having an M.P. of 152–153°, is obtained.

EXAMPLE 24

4-(1-methyl-4-piperidylidene)-4H-benzo[4,5]cyclohepta-[1,2-b]thiophen-10(9H)-one The process is effected as described in Example 23, except that ½ mol of sulphuric acid in a 20-fold quantity of water is used for every mol of 9(10)-bromo-4-(1-methyl - 4 - piperidylidene) - 4H - benzo[4,5]cyclohepta-[1,2-b]thiophene base, and after heating to 230° for 6 hours at 21 atmospheres, the title compound, having an M.P. of 152–153°, is obtained.

EXAMPLE 25

4-(1-methyl-4-piperidylidene)-4H-benzo[4,5]cyclohepta-[1,2-b]thiophen-10(9H)-one The process is effected using acids as described in Examples 14 to 24, except that the 9(10)-chloro-4-(1-methyl-4-piperidylidene) - 4H - benzo[4,5]cyclohepta[1,2-b]thiophene base is used in place of the 9(10)-bromo-4-(1-methyl - 4 - piperidylidene)-4H - benzo[4,5]cyclohepta-[1,2-b]thiophene base, and the title compound, having an M.P. of 152–153°, is obtained.

The 9(10)-chloro-4-(1-methyl - 4 - piperidylidene)-4H-benzo[4,5]cyclohepta[1,2-b]ethiophene base (M.P. 150–152°), required as starting material, is produced from 4H-benzo[4,5]cyclohepta[1,2-b]thiophen-4-one.

The following intermediates were isolated during the course of the process:

9,10-dichloro-9,10-dihydro-4H-benzo[4,5]cyclohepta-[1,2-b]thiophen-4- one (used for the next reaction in crude state),
9(10)-chloro-4H-benzo[4,5]cyclohepta[1,2-b]thiophen-4-one (M.P. 124–126°),
9(10)-chloro-4-(1-methylpiperidyl)-4H-benzo[4,5]cyclohepta[1,2-b]thiophen-4-ol (used for the next reaction in crude state).

EXAMPLE 26

4-(1-methyl-4-piperidylidene)-4H-benzo[4,5]cyclohepta-[1,2-b]thiophen-10(9H)-one The process is effected as described in Example 14, except that a mixture of 50% sulphuric acid with n-butanol (at a weight ratio of 1:2) is used in place of 25% sulphuric acid, and after heating to 100° for 16 hours, the title compound, having an M.P. of 152–153°, is obtained.

What is claimed is:

1. A process for the production of a compound of the formula:

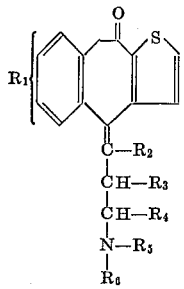

wherein
$R_1$ is hydrogen, chlorine, bromine or alkoxy of 1 to 4 carbon atoms,
$R_2$ is hydrogen,
$R_3$ and $R_4$ are each hydrogen or methyl, and
$R_5$ is alkyl of 1 to 4 carbon atoms, or
$R_5$ together with $R_2$ is an ethylene chain, or
$R_5$ together with $R_3$ is an ethylene or trimethylene chain, or
$R_5$ together with $R_4$ is a trimethylene or tetramethylene chain, and
$R_6$ is alkyl of 1 to 4 carbon atoms,
or a pharmaceutically acceptable acid addition salt thereof, which comprises treating a compound of the formula:

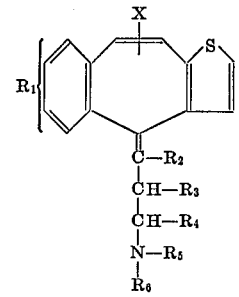

wherein
$R_1$ to $R_6$ are as defined above, and
X is chlorine or bromine in the 9 or 10 position of the 4H-benzo[4,5]cyclohepta[1,2-b]thiophene structure,
with a strong, aqueous, non-oxidizing acid.

2. The process of claim 1, in which the strong, aqueous, non-oxidizing acid is selected from sulfuric, hydrochloric, hydrobromic, phosphoric, methanesulfonic, toluenesulfonic, trifluoroacetic and trichloroacetic acid.

3. A compound of the formula:

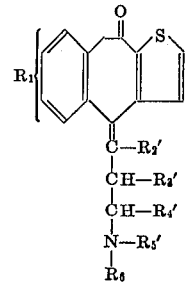

wherein
$R_1$ is hydrogen, chlorine, bromine or alkoxy of 1 to 4 carbon atoms,
$R_2'$ is hydrogen, and
each of $R_3'$ and $R_4'$ is hydrogen or methyl, and
$R_5'$ is alkyl of 1 to 4 carbon atoms, or
$R_5'$ together with $R_3'$ is ethylene or trimethylene, or
$R_5'$ together with $R_4'$ is trimethylene or tetramethylene, or
when at least one of $R_3'$ and $R_4'$ is methyl, $R_5'$ together with $R_2'$ is ethylene, and
$R_6$ is alkyl of 1 to 4 carbon atoms,
or a pharmaceutically acceptable acid addition salt thereof.

4. The compound of claim 3, which is 4-(3-dimethylaminopropylidene) - 4H - benzo[4,5]cyclohepta[1,2-b]thiophen-10(9H)-one.

5. The compound of claim 3, which is 6-chloro-4-(3-dimethylaminopropylidene) - 4H - benzo[4,5]cyclohepta[1,2-b]thiophen-10(9H)-one.

6. The compound of claim 3, which is 4-[(1-methyl-3-piperidyl)methylene]-4H-benzo[4,5]cyclohepta[1,2 - b]thiophen-10(9H)-one.

7. The compound of claim 3, which is 4-[2-(1-methyl-2-pyrrolidyl)ethylidene] - 4H - benzo[4,5]cyclohepta[1,2-b]thiophen-10(9H)-one.

8. A compound of the formula

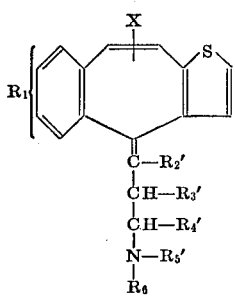

wherein
  X is chlorine or bromine in the 9 or 10 position of the 4H-benzo[4,5]cyclohepta[1,2-b]thiophene structure,
  $R_1$ is hydrogen, chlorine, bromine or alkoxy of 1 to 4 carbon atoms,
  $R_2'$ is hydrogen and
  each of $R_3'$ and $R_4'$ is hydrogen or methyl, and
  $R_5'$ is alkyl of 1 to 4 carbon atoms, or
  $R_5'$ together with $R_3'$ and $R_4'$ is methyl,
  $R_5'$ when at least one of $R_3'$ is ethylene or trimethylene, or together with $R_2'$ is ethylene, and
  $R_6'$ is alkyl of 1 to 4 carbon atoms.

9. The compound of claim 8, which is 9(10)-bromo-4-(3-dimethylaminopropylidene) - 4H - benzo[4,5]cyclohepta[1,2-b]thiophene.

10. The compound of claim 8, which is 9(10)-bromo-6-chloro-4-(3-dimethylaminopropylidene)-4H - benzo[4,5]cyclohepta[1,2-b]thiophene.

11. The compound of claim 8, which is 9(10)-bromo-4-[(1-methyl-3-piperidyl) methylene]-4H-benzo[4,5]cyclohepta[1,2-b]thiophene.

12. The compound of claim 8, which is 9(10)-bromo-4-[2-(1-methyl-2-pyrrolidyl) ethylidene] - 4H - benzo[4,5]cyclohepta[1,2-b]thiophene.

References Cited
UNITED STATES PATENTS 3,465,003  9/1969  Jucker et al. _____ 260—329
3,682,930  8/1972  Bourquin et al. ____ 260—293.57

JOHN D. RANDOLPH, Primary Examiner

U.S. Cl. XR.

260—293.57, 332.3 P, 332.5; 424—267, 274, 275